United States Patent [19]
Morooka

[11] Patent Number: 5,521,761
[45] Date of Patent: May 28, 1996

[54] REAL IMAGE MODE FINDER OPTICAL SYSTEM WITH HIGH MAGNIFICATION

[75] Inventor: Masaru Morooka, Hachioji, Japan

[73] Assignee: Olympus Optical Co., Ltd., Tokyo, Japan

[21] Appl. No.: 223,152

[22] Filed: Apr. 5, 1994

[30] Foreign Application Priority Data

Apr. 6, 1993 [JP] Japan .................................. 5-079514

[51] Int. Cl.$^6$ ........................... G02B 9/14; G02B 23/00; G03B 13/08
[52] U.S. Cl. ....................... 359/790; 359/431; 359/784; 354/225
[58] Field of Search ..................................... 359/362–363, 359/422, 428–435, 676–678, 691, 708, 793, 754–756, 761–784; 354/152, 155, 199, 219–225

[56] References Cited

U.S. PATENT DOCUMENTS

| | | | |
|---|---|---|---|
| 4,779,969 | 10/1988 | Sato et al. .............................. | 359/432 |
| 4,906,078 | 3/1990 | Inabata et al. ........................... | 359/208 |
| 4,909,614 | 3/1990 | Itoh et al. ............................... | 359/208 |
| 4,969,723 | 11/1990 | Kato et al. .............................. | 359/431 |
| 5,144,480 | 9/1992 | Ohshita .................................. | 359/432 |

*Primary Examiner*—Thong Q. Nguyen
*Attorney, Agent, or Firm*—Cushman, Darby & Cushman

[57] ABSTRACT

A real image mode finder optical system includes an objective system having a positive refracting power as a whole, an image erecting system for erecting an image, and an eyepiece system having a positive refracting power. The objective system has a meniscus lens with a negative refracting power, whose convex surface is directed toward the eye, and an objective lens with a positive refracting power. Thus, even when finder magnification is high, a wide field angle can be derived and the distance between the last surface of the eyepiece system and the eyepoint can be ensured in a long range, with a resultant easy observation.

9 Claims, 7 Drawing Sheets

FIG. 4A
SPHERICAL ABERRATION

PUPIL DIAMETER = 2mm

-2.0   2.0
(diop)

FIG. 4B
ASTIGMATISM

ω = 26.89°

-2.0   2.0
(diop)

FIG. 4C
DISTORTION

FIG. 6A
SPHERICAL ABERRATION

PUPIL DIAMETER = 2mm

-2.0    2.0
(diop)

FIG. 6B
ASTIGMATISM $\omega = 28.42°$

-2.0    2.0
(diop)

FIG. 6C
DISTORTION $\omega = 28.42°$

FIG. 8A
SPHERICAL ABERRATION

PUPIL DIAMETER = 2mm

FIG. 8B
ASTIGMATISM $\omega = 27.2°$

FIG. 8C
DISTORTION $\omega = 27.2°$

SPHERICAL ABERRATION

PUPIL DIAMETER = 2mm

FIG. 10B

ASTIGMATISM

DISTORTION

SPHERICAL
ABERRATION

PUPIL DIAMETER = 2mm

FIG. 12B

ASTIGMATISM $\omega = 27.97°$

FIG. 12C

DISTORTION $\omega = 27.97°$

SPHERICAL
ABERRATION

PUPIL DIAMETER=2mm

FIG. 14B

ASTIGMATISM $\omega = 28.65°$

FIG. 14C

DISTORTION $\omega = 28.65°$

REAL IMAGE MODE FINDER OPTICAL SYSTEM WITH HIGH MAGNIFICATION

BACKGROUND OF THE INVENTION

1. Field of the Invention

This invention relates to a real image mode finder optical system which is suitable for compact cameras such as photographic cameras and video cameras.

2. Description of the Related Art

For finder optical systems used in compact LS (lens shutter) cameras, real image mode finder optical systems of a Keplerian type (set forth, for example, in U.S. Pat. No. 5,184,252), instead of Albada and inverse Galilean types, have recently come into frequent use. In each of these conventional real image mode finder optical systems, its half field angle of incidence on the finder is no more than about 15° even with high finder magnification, while its finder magnification is only about 0.4× even with a wide finder field. Thus, no real image mode finder optical system has been made to combine the high finder magnification with the wide finder field.

Such high finder magnification in the conventional real image mode finder optical system has been obtained in the following limited way: by either relatively increasing the focal length of an objective lens compared with that of an eyepiece or relatively diminishing the focal length of the eyepiece compared with that of the objective lens. If, however, the focal length of the objective lens is increased in the above way, an intermediate image height must also be increased, which fact makes it difficult to secure compactness of the optical system and correction for aberrations. If, on the other hand, the focal length of the eyepiece is reduced, the angle of emergence of the finder becomes great, although the intermediate image height need not be increased. Consequently, if an attempt is made to ensure the distance between the last surface of the eyepiece and an eyepoint in a relatively long range, the maximum beam diameter at the eyepiece will increase because the diameter of an exit pupil is constant. Thus, the problem has arisen that it is difficult to ensure a space required for an eyepiece optical system including a reflecting member for erecting an image.

SUMMARY OF THE INVENTION

It is, therefore, an object of the present invention to provide a real image mode finder optical system which brings about a wide field angle even with high finder magnification, allows the distance between the last surface of the eyepiece and the eyepoint to be increased, and is easy for observation.

In order to attain the above-mentioned object, the real image mode finder optical system with high magnification according to the present invention includes an objective system with a positive refracting power as a whole which is comprised of a meniscus lens with a negative refracting power, directing its convex surface toward the eye, and an objective lens with a positive refracting power; an image erecting system for erecting an image; and an eyepiece system with a positive refracting power.

This arrangement allows the optical system of the present invention to be favorably corrected for Petzval curvature of field produced by the objective system. Even where a wide finder field is available, together with high finder magnification, astigmatism can be corrected with comparative ease.

Further, since a long back focus is secured by the objective system, a first reflecting member which inverts an image at least twice to erect it can be situated between the objective system and the intermediate imaging plane. As such, even when the finder magnification is high and the finder angle of emergence is large, the space occupied by a second reflecting member for erecting the image between the intermediate imaging plane and the eyepiece is narrower than that of the prior art. Consequently, the distance between the last surface of the eyepiece system and the eyepoint can be ensured in a relatively long range. Further, a field frame is situated between the first reflecting member and the second reflecting member, preferably in the vicinity of the exit surface of the first reflecting member. It is favorable that its position is located adjacent to an image plane produced by the objective system.

It is desirable that the optical system of the present invention satisfies conditions:

$$0.1 < \left| \frac{R_1 - R_2}{R_1 + R_2} \right| < 0.7 \quad (1)$$

$$0.2 < \left| \frac{R_1 - R_2}{R_1 + R_2} \right| < 0.7 \quad (1')$$

$$0.5 < \left| \frac{f_1}{f_0} \right| < 4.0 \quad (2)$$

where $R_1$ is the radius of curvature of one surface on the object side of the meniscus lens, $R_2$ is the radius of curvature of the other surface on the eye side, $f_1$ is the focal length of the meniscus lens, and $f_0$ is the focal length of the objective system.

Eq. (1) defines the shape of the meniscus lens. If the value of Eq. (1) exceeds the upper limit, the curvature will moderate arid large distortion will be produced. Conversely, if it passes the lower limit, the curvature of the surface on the object side will be severe, with the resultant production of large Petzval curvature of field. In either case, the situation is unfavorable. Preferably, Eq. (1') which is better is used.

Eq. (2) refers to the ratio of the focal length of the meniscus lens in the objective system to that of the objective system. If the value of Eq. (2) exceeds the upper limit, the distance of the back focus cannot be ensured in a long range by the objective system, thus lacking space to provide the reflecting members. On the other hand, if it passes the lower limit, it becomes difficult to correct aberration, notably distortion.

Further, the optical system of the present invention is designed so that the objective system includes, in the order from the object side, a meniscus lens with a negative refracting power, directing its convex surface toward the eye, and a biconvex lens with a positive refracting power. By this arrangement, aberrations can be favorably corrected. In this case, for favorably correcting aberrations even when the finder field is widened, it is desirable that the surface on the eye side of the positive lens is configured as an aspherical surface whose curvature moderates progressively in separating from the optical axis.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
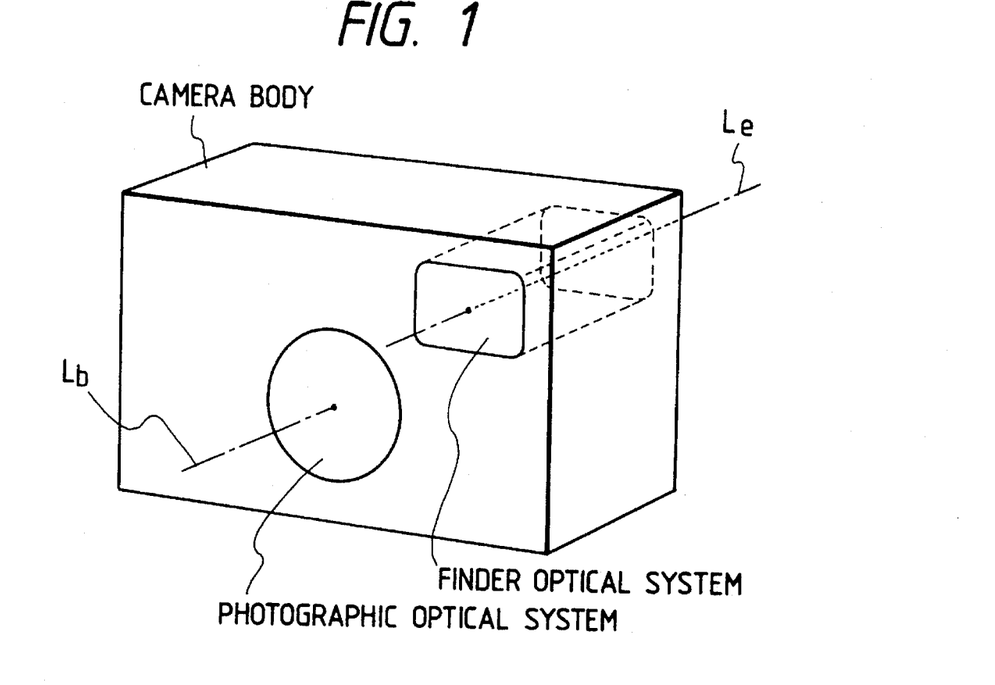
FIG. 1 is an explanatory view showing that a real image mode finder optical system according to the present invention is disposed independent of a photographic optical system in a camera.
Figure 2:
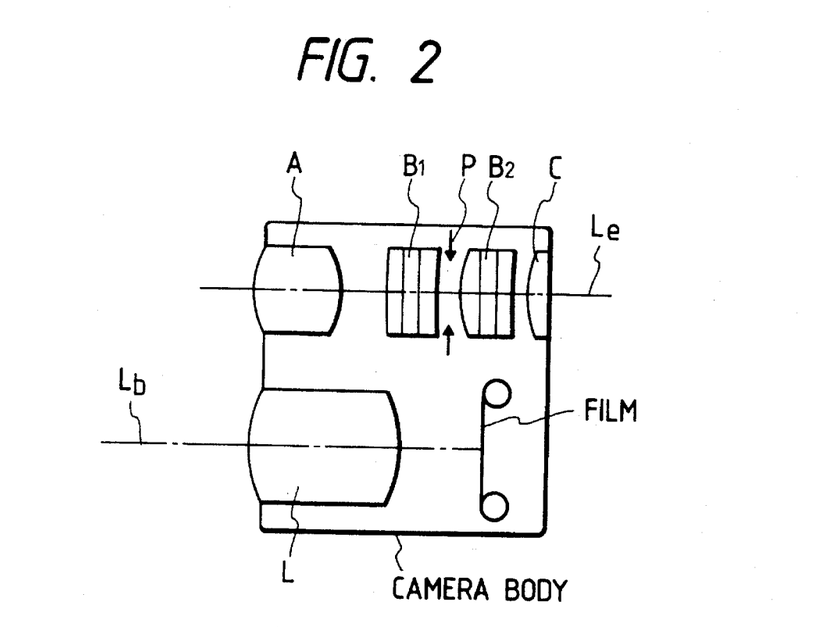
FIG. 2 is a sectional view of the camera shown in FIG. 1.

The real image mode finder optical system of the present invention, as shown in FIG. 1, is designed independent of a photographic optical system. Specifically, as depicted in FIG. 2, a finder optical path Le is separated from a photographic optical path Lb. In this figure, reference symbol A denotes a finder objective system; $B_1$ a first reflecting member with two reflecting surfaces; $B_2$ a second reflecting member with two reflecting surfaces; C an eyepiece system; and L a photographic objective lens. Symbol P designates a field frame, which is situated at an intermediate imaging plane adjacent to the exit surface of the first reflecting member $B_1$ by the objective system A.

Figure 3:
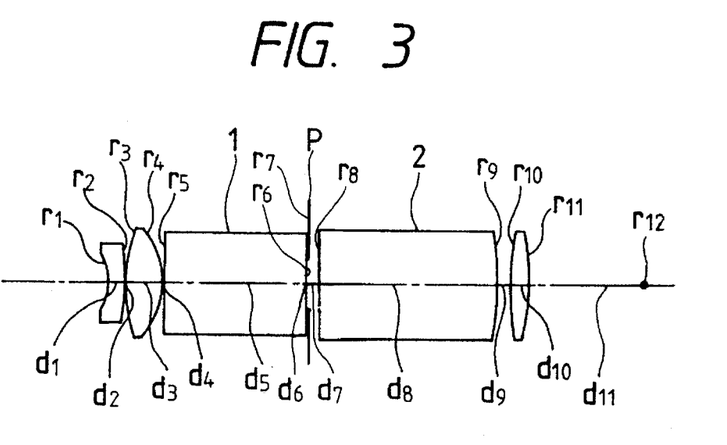
FIG. 3 is a view showing the configuration of a first embodiment of the present invention.
Figure 4A:
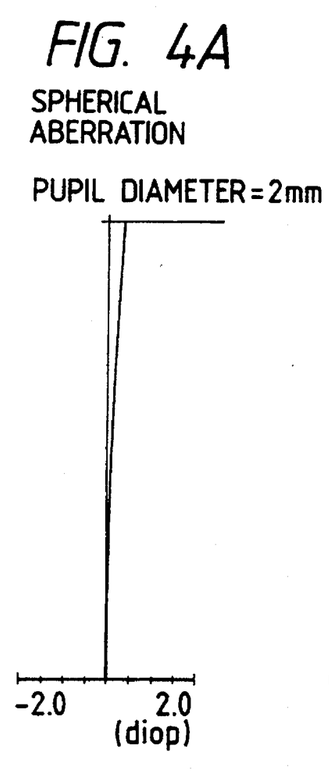
FIGS. 4A, 4B, and 4C are diagrams showing aberration curves in the first embodiment.
Figure 4B:
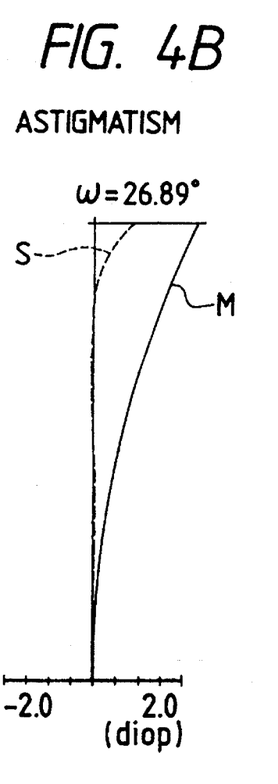
Figure 4C:
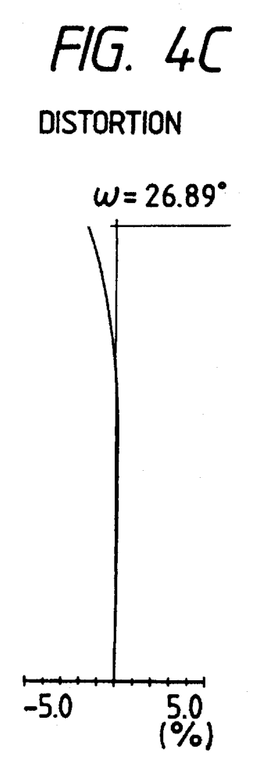

In accordance with the embodiments shown, the present invention will be explained in detail below. FIG. 3 and FIGS. 4A–4C show the configuration and aberration curves of the first embodiment, respectively. In FIG. 3, reference numeral 1 represents a prism as the first reflecting member which inverts an image formed by the objective system and 2 represents a prism as the second reflecting member which laterally inverts the image.

The numerical data of the first embodiment are shown below.

| Half field angle of incidence $\omega = 26.89°$ Finder magnification = 0.66x | | | |
|---|---|---|---|
| $r_1 = -10.3499$ | | | |
| | $d_1 = 2.720$ | $n_1 = 1.61484$ | $v_1 = 51.17$ |
| $r_2 = -28.5910$ (aspherical) | | | |
| | $d_2 = 0.200$ | | |
| $r_3 = 25.2027$ | | | |
| | $d_3 = 6.000$ | $n_3 = 1.74950$ | $v_3 = 25.27$ |

| -continued | | | |
|---|---|---|---|
| Half field angle of incidence $\omega = 26.89°$ Finder magnification = 0.66x | | | |
| $r_4 = -10.1855$ (aspherical) | | | |
| | $d_4 = 0.200$ | | |
| $r_5 = 9999.0000$ | | | |
| | $d_5 = 23.000$ | $n_5 = 1.65160$ | $v_5 = 58.52$ |
| $r_6 = 9999.0000$ | | | |
| | $d_6 = 0.000$ | | |
| $r_7 = 9999.0000$ (field frame) | | | |
| | $d_7 = 0.800$ | | |
| $r_8 = 9999.0000$ | | | |
| | $d_8 = 29.000$ | $n_8 = 1.81600$ | $v_8 = 46.62$ |
| $r_9 = -73.5581$ | | | |
| | $d_9 = 2.075$ | | |
| $r_{10} = 39.0398$ (aspherical) | | | |
| | $d_{10} = 3.300$ | $n_{10} = 1.74950$ | $v_{10} = 35.27$ |
| $r_{11} = -32.1966$ | | | |
| | $d_{11} = 16.763$ | | |
| $r_{12} =$ (pupil) | | | |

Aspherical coefficients
Second surface
P=0.9760
E=0.14289×10$^{-3}$, F=0.43059×10$^{-5}$,
G=−0.26652×10$^{-7}$, H=−0.10619×10$^{-8}$
Fourth surface
P=−0.2677
E=−0.89210×10$^{-5}$, F=−0.77296×10$^{-6}$,
G=−0.88554×10$^{-8}$, H=0.62828×10$^{-10}$
Tenth surface
P=1.0000
E=−0.93195×10$^{-5}$, F=−0.30373×10$^{-7}$,
G=−0.79707×10$^{-10}$, H=0.32333×10$^{-11}$ The values of Eqs. (1) and (2) in the first embodiment are as follows:

$|(R_1-R_2)/(R_1+R_2)|=0.47$ $|f_1/f_0|=2.22$

Figure 5:
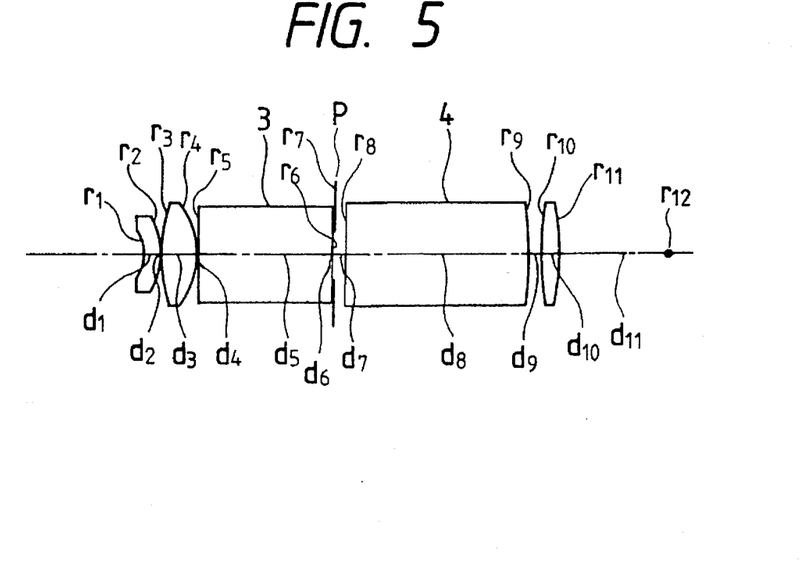
FIG. 5 is a view showing the configuration of a second embodiment of the present invention.
Figure 6A:
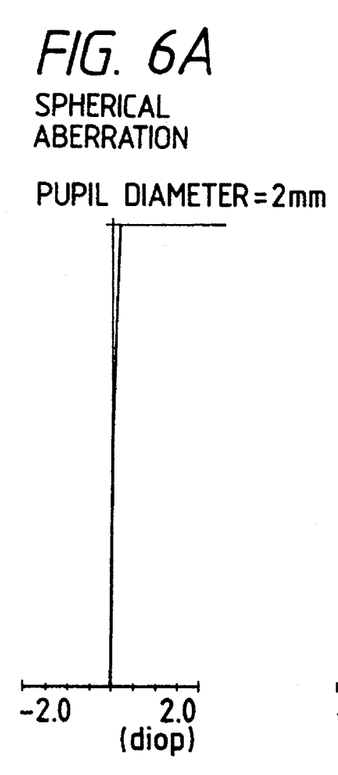
FIGS. 6A, 6B, and 6C are diagrams showing aberration curves in the second embodiment.
Figure 6B:
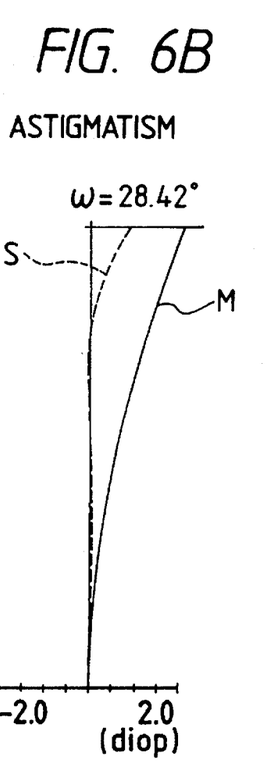
Figure 6C:
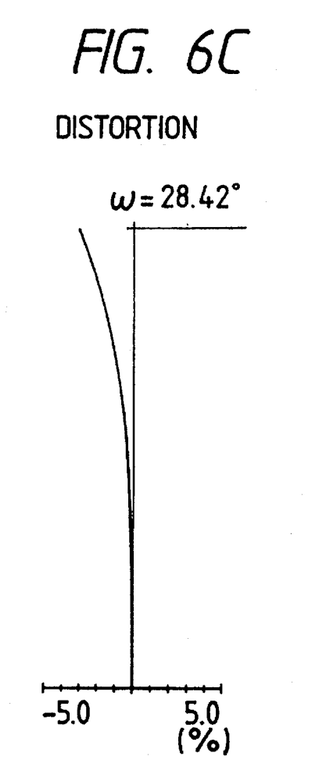

FIG. 5 and FIGS. 6A–6C show the configuration and aberration curves of the second embodiment, respectively. In FIG. 5, reference numeral 3 represents a prism as the first reflecting member which inverts an image formed by the objective system and 4 represents a prism as the second reflecting member which laterally inverts the image.

The numerical data of the second embodiment are shown below.

| Half field angle of incidence $\omega = 28.42°$ Finder magnification = 0.60x | | | |
|---|---|---|---|
| $r_1 = -6.0083$ | | | |
| | $d_1 = 2.500$ | $n_1 = 1.61484$ | $v_1 = 51.17$ |
| $r_2 = -9.9174$ (aspherical) | | | |
| | $d_2 = 0.200$ | | |
| $r_3 = 30.8893$ | | | |
| | $d_3 = 5.600$ | $n_3 = 1.74950$ | $v_3 = 35.27$ |
| $r_4 = -10.0109$ (aspherical) | | | |
| | $d_4 = 0.200$ | | |
| $r_5 = 9999.0000$ | | | |
| | $d_5 = 22.000$ | $n_5 = 1.62292$ | $v_5 = 58.14$ |
| $r_6 = 9999.0000$ | | | |
| | $d_6 = 0.000$ | | |
| $r_7 = 9999.0000$ (field frame) | | | |
| | $d_7 = 0.800$ | | |

-continued

Half field angle of incidence ω = 28.42°
Finder magnification = 0.60x

| $r_8 = 9999.0000$ | | | |
|---|---|---|---|
| | $d_8 = 29.000$ | $n_8 = 1.81600$ | $v_8 = 46.62$ |
| $r_9 = -73.5581$ | | | |
| | $d_9 = 2.075$ | | |
| $r_{10} = 39.0398$ (aspherical) | | | |
| | $d_{10} = 3.300$ | $n_{10} = 1.74950$ | $v_{10} = 35.27$ |
| $r_{11} = -32.1966$ | | | |
| | $d_{11} = 16.763$ | | |
| $r_{12} = $ (pupil) | | | |

Aspherical coefficients
Second surface
 $P=0.5127$
 $E=0.70474\times10^{-4}$, $F=0.25272\times10^{-5}$,
 $G=0.10154\times10^{-7}$, $H=-0.16886\times10^{-9}$
Fourth surface
 $P=-0.0245$
 $E=0.85657\times10^{-5}$, $F=0.29072\times10^{-8}$,
 $G=0.60685\times10^{-8}$, $H=-0.30638\times10^{-10}$
Tenth surface
 $P=1.0000$
 $E=-0.93195\times10^{-5}$, $F=-0.30373\times10^{-7}$,
 $G=-0.79707\times10^{-10}$, $H=0.32333\times10^{-11}$ The values of Eqs. (1) and (2) in the second embodiment are as follows:

$|(R_1-R_2)/(R_1+R_2)|=0.25$ $|f_1/f_0|=2.8$

Figure 7:
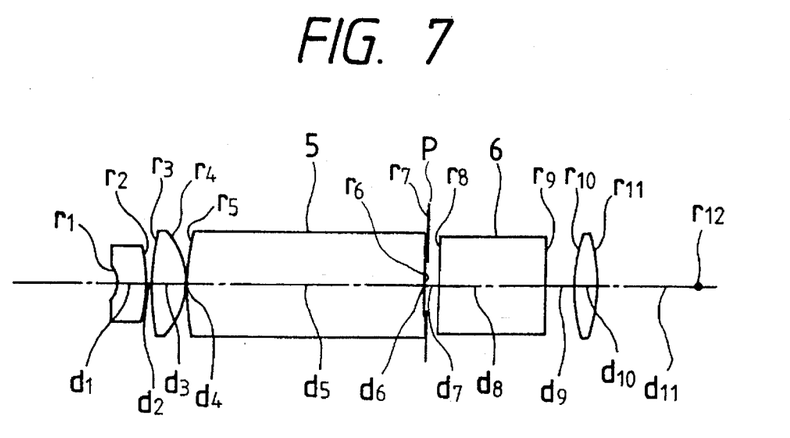
FIG. 7 is a view showing the configuration of a third embodiment of the present invention.
Figures 8A, 8B:
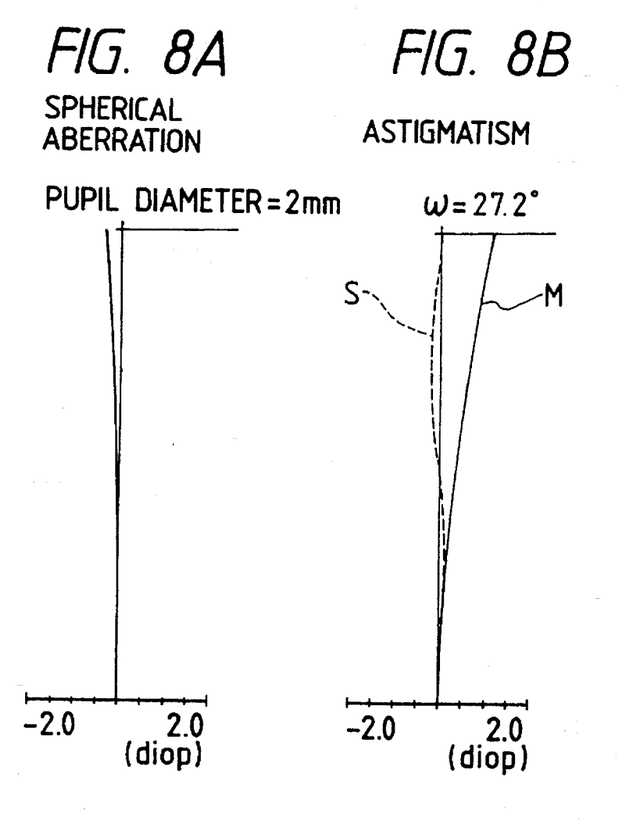
FIGS. 8A, 8B, and 8C are diagrams showing aberration curves in the third embodiment.
Figure 8C:
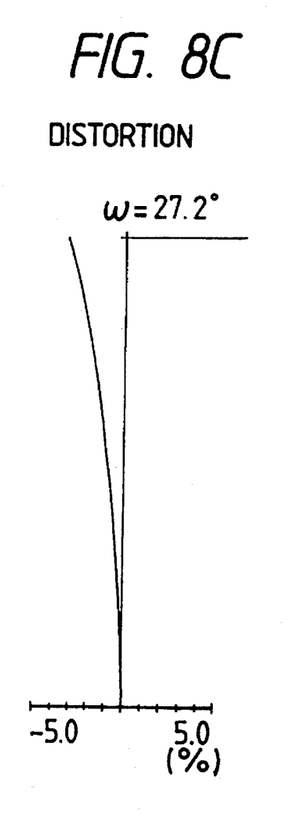

FIG. 7 and FIGS. 8A–8C show the configuration and aberration curves of the third embodiment, respectively. In FIG. 7, reference numeral 5 represents a prism as the first reflecting member which turns an image formed by the objective system upside down and laterally inverts it, and 6 represents a prism as the second reflecting member which laterally inverts the image.

The numerical data of the third embodiment are shown below.

Half field angle of incidence ω = 27.20°
Finder magnification = 0.70x

| $r_1 = -4.7501$ | | | |
|---|---|---|---|
| | $d_1 = 4.529$ | $n_1 = 1.61484$ | $v_1 = 51.17$ |
| $r_2 = -18.9323$ (aspherical) | | | |
| | $d_2 = 0.796$ | | |
| $r_3 = 46.4176$ | | | |
| | $d_3 = 5.499$ | $n_3 = 1.74950$ | $v_3 = 35.27$ |
| $r_4 = -10.2710$ (aspherical) | | | |
| | $d_4 = 0.200$ | | |
| $r_5 = 61.1569$ | | | |
| | $d_5 = 38.00$ | $n_5 = 1.86300$ | $v_5 = 41.53$ |
| $r_6 = 9999.0000$ | | | |
| | $d_6 = 0.000$ | | |
| $r_7 = 9999.0000$ (field frame) | | | |
| | $d_7 = 1.000$ | | |
| $r_8 = 9999.0000$ | | | |
| | $d_8 = 17.044$ | $n_8 = 1.50137$ | $v_8 = 56.40$ |
| $r_9 = 9999.0000$ | | | |
| | $d_9 = 4.496$ | | |
| $r_{10} = 25.2411$ (aspherical) | | | |
| | $d_{10} = 3.500$ | $n_{10} = 1.74950$ | $v_{10} = 35.27$ |
| $r_{11} = -27.2592$ | | | |
| | $d_{11} = 15.971$ | | |
| $r_{12} = $ (pupil) | | | |

Aspherical coefficients
Second surface
 $P=-0.0381$
 $E=0.16776\times10^{-3}$, $F=0.37005\times10^{-5}$,
 $G=0.11511\times10^{-6}$, $H=-0.28415\times10^{-9}$
Fourth surface
 $P=0.2187$
 $E=-0.24620\times10^{-4}$, $F=-0.11955\times10^{-6}$,
 $F=-0.87640\times10^{-9}$, $H=0.93672\times10^{-10}$
Tenth surface
 $P=1.0000$
 $E=-0.32264\times10^{-4}$, $F=-0.15248\times10^{-7}$,
 $G=0.71930\times10^{-9}$, $H=-0.10399\times10^{-10}$ The values of Eqs. (1) and (2) in the third embodiment are as follows:

$|(R_1-R_2)/(R_1+R_2)|=0.6$ $|f_1/f_0|=0.93$

Figure 9:
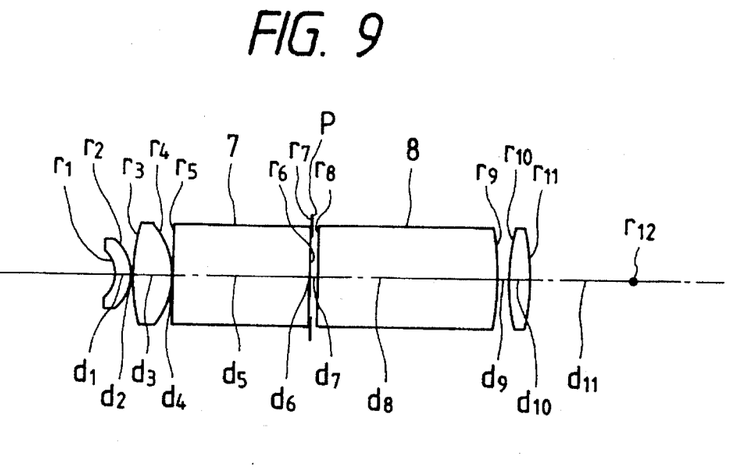
FIG. 9 is a view showing the configuration of a fourth embodiment of the present invention.
Figure 10A:
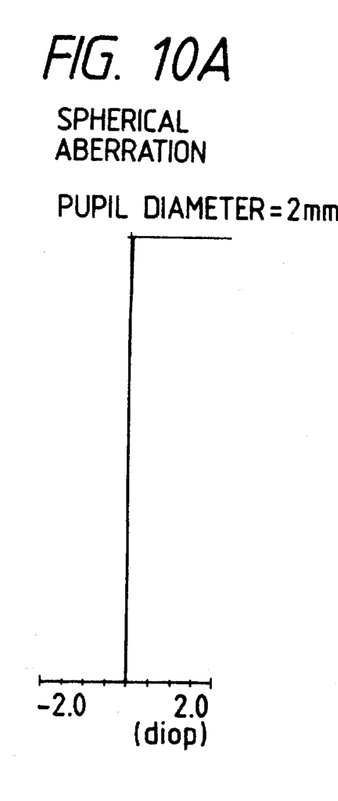
FIGS. 10A, 10B, and 10C are diagrams showing aberration curves in the fourth embodiment.
Figure 10B:
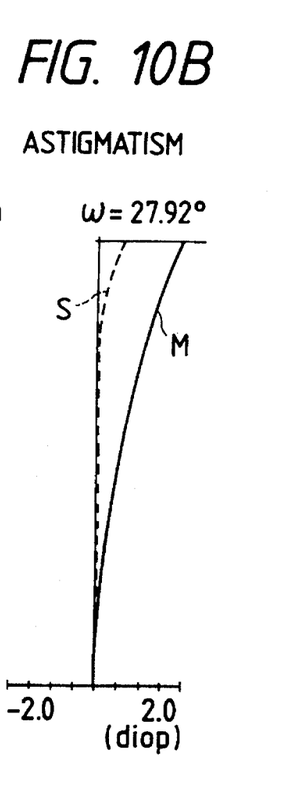
Figure 10C:
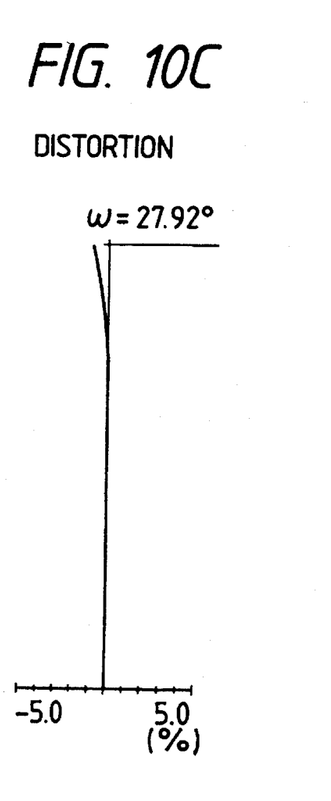

FIG. 9 and FIGS. 10A–10C show the configuration and aberration curves of the fourth embodiment, respectively. In FIG. 9, reference numeral 7 represents a prism as the first reflecting member which inverts an image formed by the objective system and 8 represents a prism as the second reflecting member which laterally inverts the image.

The numerical data of the fourth embodiment are shown below.

Half field angle of incidence ω = 27.92°
Finder magnification = 0.60x

| $r_1 = -4.6210$ | | | |
|---|---|---|---|
| | $d_1 = 2.436$ | $n_1 = 1.68893$ | $v_1 = 31.08$ |
| $r_2 = -7.0294$ | | | |
| | $d_2 = 0.200$ | | |
| $r_3 = 24.6662$ | | | |
| | $d_3 = 6.578$ | $n_3 = 1.67790$ | $v_3 = 55.33$ |
| $r_4 = -9.9903$ (aspherical) | | | |
| | $d_4 = 0.200$ | | |
| $r_5 = 9999.0000$ | | | |
| | $d_5 = 22.200$ | $n_5 = 1.58913$ | $v_5 = 61.18$ |
| $r_6 = 9999.0000$ | | | |
| | $d_6 = 0.000$ | | |
| $r_7 = 9999.0000$ (field frame) | | | |
| | $d_7 = 1.000$ | | |
| $r_8 = 9999.0000$ | | | |
| | $d_8 = 29.300$ | $n_8 = 1.81600$ | $v_8 = 46.62$ |
| $r_9 = -49.5007$ | | | |
| | $d_9 = 1.865$ | | |
| $r_{10} = 42.4019$ | | | |
| | $d_{10} = 3.400$ | $n_{10} = 1.67790$ | $v_{10} = 55.33$ |
| $r_{11} = -31.7659$ (aspherical) | | | |
| | $d_{11} = 16.200$ | | |
| $r_{12} = $ (pupil) | | | |

Aspherical coefficients
Fourth surface
 $P=-0.4377$
 $E=0.21644\times10^{-4}$, $F=0.56855\times10^{-6}$,
 $G=-0.10036\times10^{-8}$, $H=-0.20474\times10^{-10}$ Eleventh surface
P=1.0000
E=0.11614×10$^{-4}$, F=−0.13477×10$^{-6}$,
G=0.26524×10$^{-8}$, H=−0.21095×10$^{-10}$ The values of Eqs. (1) and (2) in the fourth embodiment are as follows:

$|(R_1-R_2)/(R_1+R_2)|=0.21$ $|f_1/f_0|=2.85$

Figure 11:
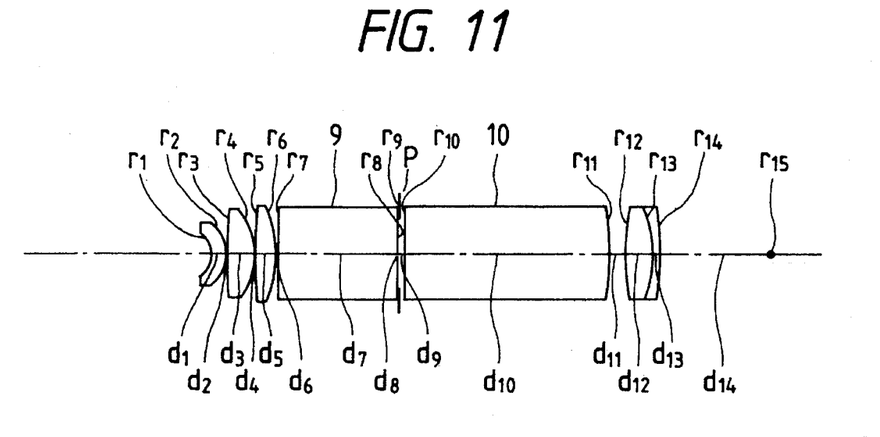
FIG. 11 is a view showing the configuration of a fifth embodiment of the present invention.
Figure 12A:
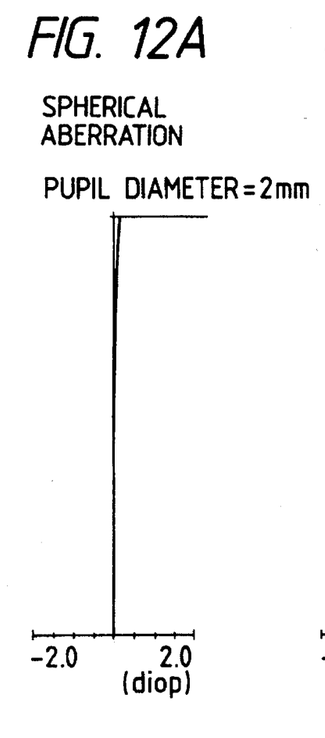
FIGS. 12A, 12B, and 12C are diagrams showing aberration curves in the fifth embodiment.
Figure 12B:
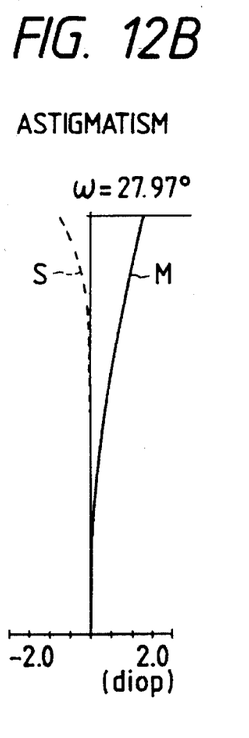
Figure 12C:
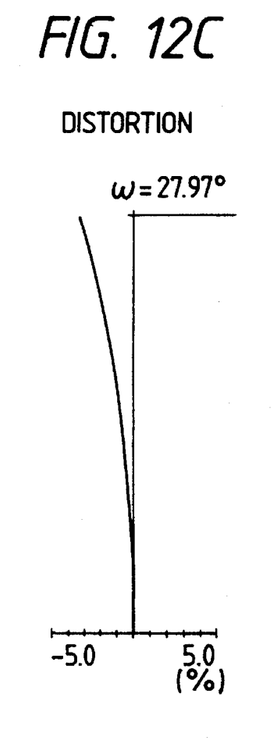

FIG. 11 and FIGS. 12A–12C show the configuration and aberration curves of the fifth embodiment, respectively. In FIG. 11, reference numeral 9 represents a prism as the first reflecting member which inverts an image formed by the objective system and 10 represents a prism as the second reflecting member which laterally inverts the image.

The numerical data of the fifth embodiment are shown below.

| Half field angle of incidence ω = 27.97° Finder magnification = 0.50x | | | |
| --- | --- | --- | --- |
| $r_1 = -3.5533$ | | | |
| | $d_1 = 2.000$ | $n_1 = 1.68893$ | $v_1 = 31.08$ |
| $r_2 = -5.5765$ | | | |
| | $d_2 = 0.200$ | | |
| $r_3 = 75.6162$ | | | |
| | $d_3 = 4.000$ | $n_3 = 1.58313$ | $v_3 = 59.36$ |
| $r_4 = -8.1285$ (aspherical) | | | |
| | $d_4 = 0.200$ | | |
| $r_5 = 222.7200$ | | | |
| | $d_5 = 2.800$ | $n_5 = 1.48749$ | $v_5 = 70.20$ |
| $r_6 = -15.4275$ | | | |
| | $d_6 = 0.400$ | | |
| $r_7 = 9999.0000$ | | | |
| | $d_7 = 17.196$ | $n_7 = 1.53192$ | $v_7 = 48.90$ |
| $r_8 = 9999.0000$ | | | |
| | $d_8 = 0.000$ | | |
| $r_9 = 9999.0000$ (field frame) | | | |
| | $d_9 = 1.000$ | | |
| $r_{10} = 9999.0000$ | | | |
| | $d_{10} = 29.080$ | $n_{10} = 1.76200$ | $v_{10} = 40.10$ |
| $r_{11} = -33.1376$ | | | |
| | $d_{11} = 2.050$ | | |
| $r_{12} = 32.7630$ | | | |
| | $d_{12} = 4.000$ | $n_{12} = 1.69350$ | $v_{12} = 53.23$ |
| $r_{13} = -14.7406$ | | | |
| | $d_{13} = 0.900$ | $n_{13} = 1.68893$ | $v_{13} = 31.08$ |
| $r_{14} = -72.6081$ | | | |
| | $d_{14} = 13.912$ | | |
| $r_{15} =$ (pupil) | | | |

Aspherical coefficients
Fourth surface
P=1.0000
E=0.22229×10$^{-3}$, F=0.26119×10$^{-5}$,
G=−0.22014×10$^{-8}$, H=0.89307×10$^{-9}$ The values of Eqs. (1) and (2) in the fifth embodiment are as follows:

$|(R_1-R_2)/(R_1+R_2)|=0.22$ $|f_1/f_0|=2.44$

Figure 13:
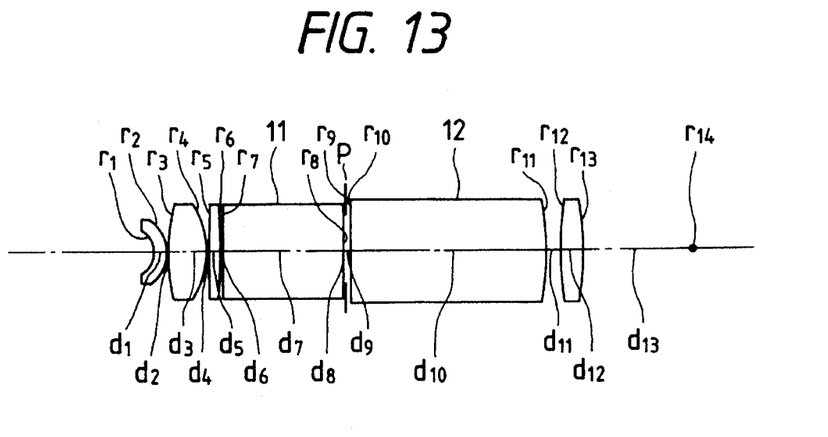
FIG. 13 is a view showing the configuration of a sixth embodiment of the present invention.
Figure 14A:
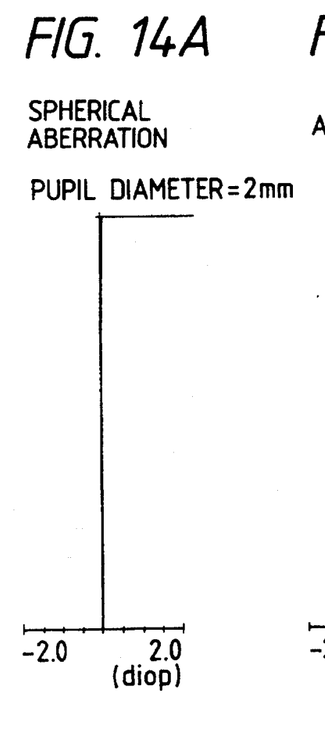
FIGS. 14A, 14B, and 14C are diagrams showing aberration curves in the sixth embodiment.
Figure 14B:
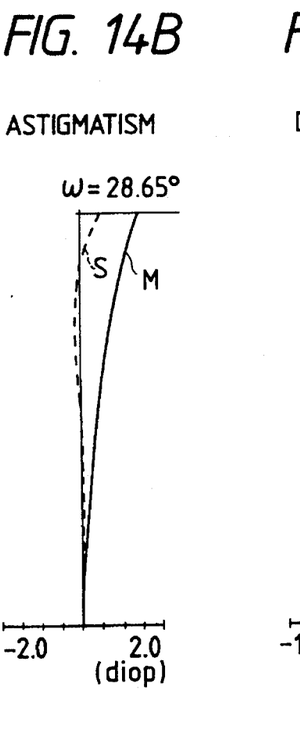
Figure 14C:
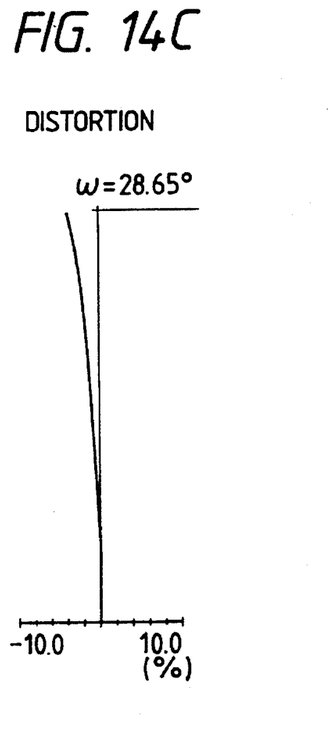

FIG. 13 and FIGS. 14A–14C show the configuration and aberration curves of the sixth embodiment, respectively. In FIG. 13, reference numeral 11 represents a prism as the first reflecting member which inverts an image formed by the objective system and 12 represents a prism as the second reflecting member which laterally inverts the image.

The numerical data of the sixth embodiment are shown below.

| Half field angle of incidence ω = 28.65° Finder magnification = 0.50x | | | |
| --- | --- | --- | --- |
| $r_1 = -3.7514$ | | | |
| | $d_1 = 2.000$ | $n_1 = 1.68893$ | $v_1 = 31.08$ |
| $r_2 = -5.5379$ | | | |
| | $d_2 = 0.200$ | | |
| $r_3 = 24.7699$ | | | |
| | $d_3 = 6.000$ | $n_3 = 1.69350$ | $v_3 = 53.23$ |
| $r_4 = -9.6569$ (aspherical) | | | |
| | $d_4 = 0.200$ | | |
| $r_5 = 162.6302$ | | | |
| | $d_5 = 1.620$ | $n_5 = 1.67790$ | $v_5 = 55.33$ |
| $r_6 = -92.3987$ | | | |
| | $d_6 = 0.400$ | | |
| $r_7 = 9999.0000$ | | | |
| | $d_7 = 17.500$ | $n_7 = 1.67790$ | $v_7 = 55.33$ |
| $r_8 = 9999.0000$ | | | |
| | $d_8 = 0.000$ | | |
| $r_9 = 9999.0000$ (field frame) | | | |
| | $d_9 = 1.000$ | | |
| $r_{10} = 9999.0000$ | | | |
| | $d_{10} = 28.100$ | $n_{10} = 1.72916$ | $v_{10} = 54.68$ |
| $r_{11} = -37.5586$ | | | |
| | $d_{11} = 2.000$ | | |
| $r_{12} = 41.2531$ (aspherical) | | | |
| | $d_{12} = 3.500$ | $n_{12} = 1.67790$ | $v_{12} = 55.33$ |
| $r_{13} = -37.4400$ | | | |
| | $d_{13} = 16.314$ | | |
| $r_{14} =$ (pupil) | | | |

Aspherical coefficients
Fourth surface
P=−0.1817
E=0.36140×10$^{-4}$, F=0.15916×10$^{-5}$,
G=−0.23852×10$^{-7}$, H=0.15612×10$^{-9}$
Twelfth surface
P=1.0000
E=−0.69205×10$^{-5}$, F=0.24822×10$^{-8}$,
G=0.31040×10$^{-8}$, H=−0.41156×10$^{-10}$ The values of Eqs. (1) and (2) in the sixth embodiment are as follows:

$|(R_1-R_2)/(R_1+R_2)|=0.19$ $|f_1/f_0|=3.19$

In each embodiment mentioned above, $r_1, r_2, \ldots$ represent radii of curvature of individual lens surfaces; $d_1, d_2, \ldots$ thicknesses of individual lenses or spaces therebetween; $n_1, n_3 \ldots$ refractive indices of individual lenses; and $v_1, v_3, \ldots$ Abbe's numbers of individual lenses.

Also, the configurations of aspherical surfaces in each embodiment are expressed by the following equation using the aspherical coefficients:

$$X = \frac{CS^2}{1 + \sqrt{1 - PC^2S^2}} + ES^4 + FS^6 + GS^8 + HS^{10}$$

where X represents the coordinates in the direction of the optical axis, S the coordinates in the direction normal to the optical axis, C the curvature (=1/r) at the vertex of the aspherical surface, and P the conic constant.

What is claimed is:

1. A real image mode finder optical system with high magnification, comprising:

an objective system including a negative meniscus lens and a first positive lens which are fixedly disposed in an optical axis of said finder optical system, and having a positive refracting power as a whole, said negative meniscus lens being a most entrance side optical element included in said objective system with a convex surface thereof being directed toward a pupil, said first positive lens being situated on a pupil side of said negative meniscus lens;

an image erecting system for erecting an object image formed by said objective system by reflecting light from said objective system a plurality of times; and an eyepiece system having a positive refracting power;

wherein said objective system satisfies the following conditions:

$$0.2 < \left| \frac{R_1 - R_2}{R_1 + R_2} \right| < 0.7;$$

$$0.5 < \left| \frac{f_1}{f_0} \right| < 4.0$$

wherein $R_1$ is a radius of curvature of an object-side surface of said negative meniscus lens, $R_2$ is a radius of curvature of an eye-side surface of said negative meniscus lens, $f_1$ is a focal length of said negative meniscus lens, and $f_0$ is a focal length of said objective system.

2. A real image mode finder optical system with high magnification according to claim 1, wherein said finder optical system is disposed independent of a photographic optical system.

3. A real image mode finder optical system according to claims 1 or 2, wherein a second positive lens is disposed on a pupil side of said first positive lens with an air space left between said first positive lens and said second positive lens.

4. A real image mode finder optical system according to claim 1 or 2, wherein said image erecting system includes a Porro prism.

5. A real image mode finder optical system according to claim 1 or 2, wherein said image erecting system includes, in order from an object side, a first reflecting member, a field frame disposed adjacent to an intermediate imaging plane, and a second reflecting member.

6. A real image mode finder optical system according to claim 5, wherein said first reflecting member has at least two reflecting surfaces.

7. A real image mode finder optical system according to claim 1 or 2, wherein at least one surface of said first positive lens is aspherical.

8. A real image mode finder optical system according to claim 7, wherein said first positive lens is a biconvex lens.

9. A real image mode finder optical system according to claim 1 or 2, wherein said first positive lens is a biconvex lens.

* * * * *